(12) United States Patent
Chang (10) Patent No.: US 11,592,736 B2
(45) Date of Patent: Feb. 28, 2023

(54) HOMOGENIZING ELEMENT AND PROJECTION DEVICE

(71) Applicant: Coretronic Corporation, Hsin-Chu (TW)

(72) Inventor: Min-Chang Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/489,808

(22) Filed: Sep. 30, 2021

(65) Prior Publication Data

US 2022/0146920 A1 May 12, 2022

(30) Foreign Application Priority Data

Nov. 6, 2020 (CN) .......................... 202022543134.1

(51) Int. Cl.
*G03B 21/20* (2006.01)
(52) U.S. Cl.
CPC ....... *G03B 21/208* (2013.01); *G03B 21/2066* (2013.01)
(58) Field of Classification Search
None
See application file for complete search history.

(56) References Cited

U.S. PATENT DOCUMENTS

| 2006/0008237 A1* | 1/2006 | Imade | .................. | G02B 6/0001 385/146 |
| 2007/0195278 A1* | 8/2007 | Yokote | ............... | G03B 21/2033 353/34 |

FOREIGN PATENT DOCUMENTS

CN               101004482 A     7/2007

* cited by examiner

*Primary Examiner* — Bao-Luan Q Le
*Assistant Examiner* — Danell L Owens (57) ABSTRACT

A homogenizing element includes a light incident end, a light exit end, a first surface, a second surface, a reflective layer and a first dichroic layer. The first surface extends from the light incident end to the light exit end. The second surface extends from the light incident end to the light exit end, and the second surface overlaps the first surface and is non-parallel to the first surface. The first dichroic layer is disposed on the first surface and configured to allow a first beam to pass therethrough and reflect a second beam. The reflective layer is disposed on the second surface and configured to reflect the first beam. A projection device adopting the homogenizing element is also provided. The homogenizing element and the projection device provided can adjust the beam angles of different color beams respectively.

15 Claims, 7 Drawing Sheets

HOMOGENIZING ELEMENT AND PROJECTION DEVICE

CROSS-REFERENCE TO RELATED APPLICATION

This application claims the priority benefit of China application CN202022543134.1, filed on Nov. 6, 2020. The entirety of the above-mentioned patent application is hereby incorporated by reference herein and made a part of this specification.

FIELD OF THE INVENTION

The invention relates to an optical element, and more particularly to a homogenizing element and a projection device adopting the homogenizing element.

BACKGROUND OF THE INVENTION

In general, a laser projector can include components such as a light source, a light combining system, a filter wheel, a homogenizing element, a light valve and a projection lens. The filter wheel is configured to filter the beams provided by the light source and the light combining system. The homogenizing element is usually disposed on the beam path emitted from the filter wheel to homogenize the beam. Then, the beam is transmitted to the light valve. After the light valve converts the beam into an image beam, the projection lens projects the image beam onto a screen to form an image on the screen.

However, in the structure in which the light source and the light combining system adopt a plurality of light sources, the beam angles of the beams provided by the light sources entering the homogenizing element may not be the same. The existing homogenizing element can only increase or decrease the beam angles of all beams at the same time, but cannot adjust the beam angles separately. Therefore, after the beams pass through the homogenizing element, a part of the beams cannot be fully incident on the condenser lens and the light valve due to the excessive beam angle, thereby reducing the light utilization efficiency. In addition, because the beam angle of the other part of the beams is too small, the energy of the beam is excessively concentrated, causing problems such as color spots and uneven brightness in the image.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a homogenizing element, which can adjust the beam angles of different color beams respectively.

The invention provides a projection device to have the advantage of good image quality.

Other objectives and advantages of the invention can be further illustrated by the technical features broadly embodied and described as follows.

In order to achieve one or a part or all of the above or other objectives, the homogenizing element provided by the invention includes a light incident end, a light exit end, a first surface, a second surface, a reflective layer and a first dichroic layer. The first surface extends from the light incident end to the light exit end. The second surface extends from the light incident end to the light exit end, and the second surface overlaps the first surface and is non-parallel to the first surface. The first dichroic layer is disposed on the first surface and configured to allow a first beam to pass therethrough and reflect a second beam. The reflective layer is disposed on the second surface and configured to reflect the first beam.

In order to achieve one or a part or all of the above or other objectives, the projection device provided by the invention includes an illumination system, a light valve and a projection lens. The illumination system is configured to provide an illumination beam. The light valve is disposed on a transmission path of the illumination beam to convert the illumination beam into an image beam. The projection lens is disposed on a transmission path of the image beam. The illumination system includes a light source module and the aforementioned homogenizing element. The light source module is configured to provide a beam. The beam includes a first beam and a second beam. The homogenizing element is disposed on a transmission path of the beam to convert the beam into the illumination beam.

In the homogenizing element of the embodiment of the invention, because the first dichroic layer overlaps and is non-parallel to the reflective layer, the beam angle of the second beam can be adjusted by the first dichroic layer and the beam angle of the first beam can be adjusted by the reflective layer. Therefore, the homogenizing element of the embodiment of the invention can adjust the beam angles of the different color beams respectively, so that the color beams can be emitted at a more uniform beam angle. Since adopting the above-mentioned homogenizing element, the projection device of the invention has the advantage of good image quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
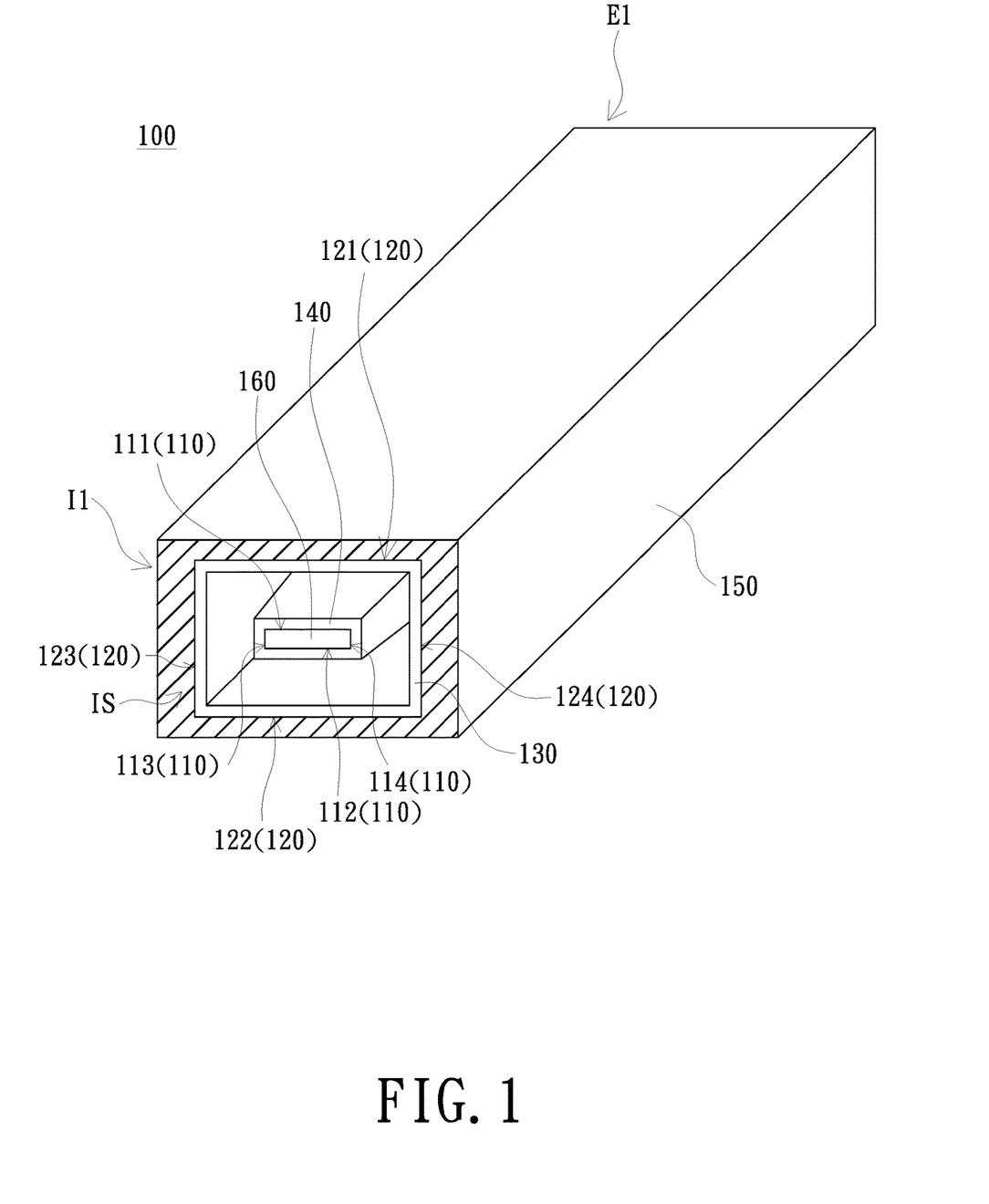
FIG. 1 is a three-dimensional schematic diagram of a homogenizing element according to an embodiment of the invention.
Figure 2:
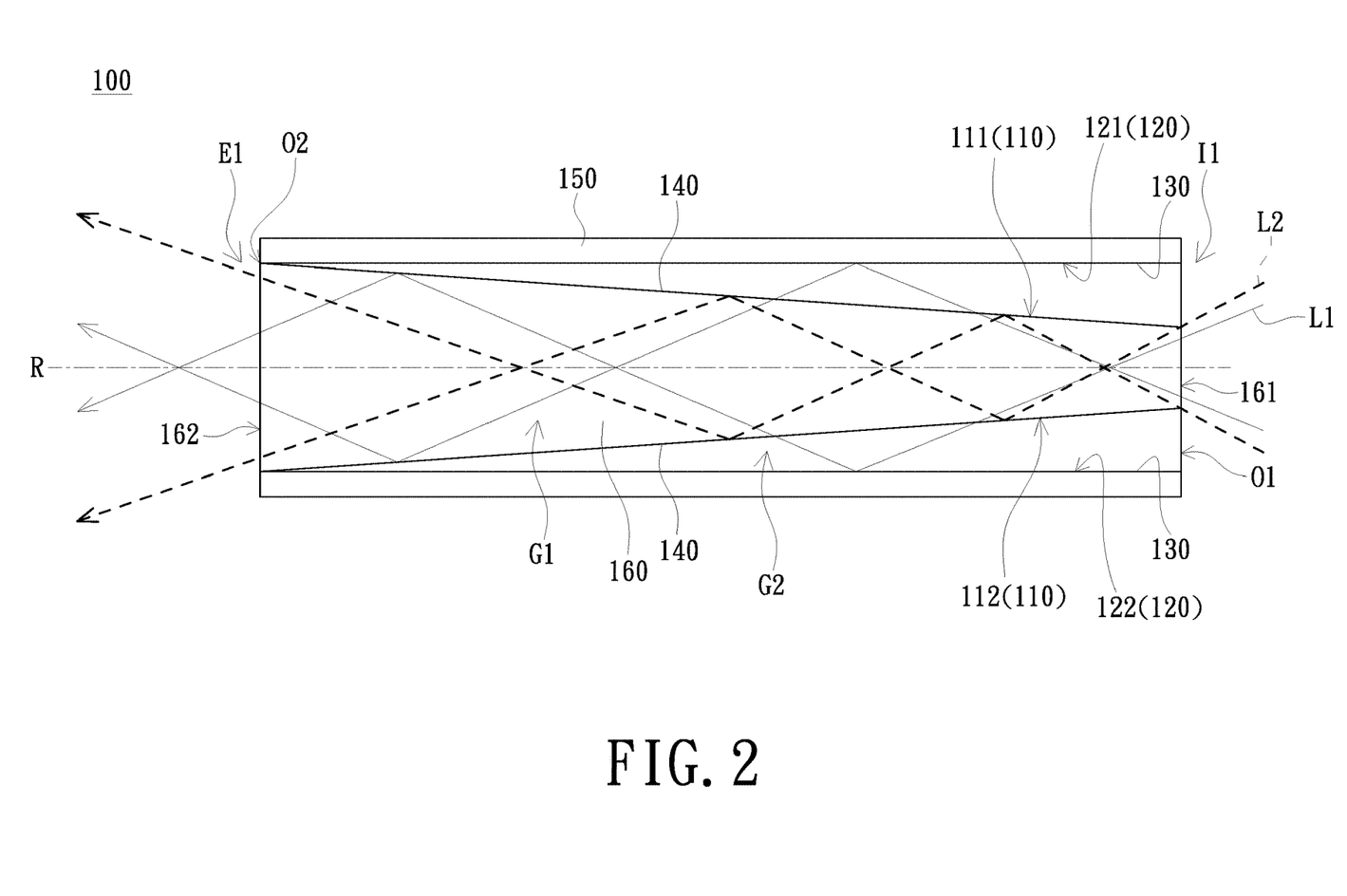
FIG. 2 is a schematic cross-sectional diagram of the homogenizing element of FIG. 1.

FIG. 1 is a three-dimensional schematic diagram of a homogenizing element according to an embodiment of the invention. FIG. 2 is a schematic cross-sectional diagram of the homogenizing element of FIG. 1. It should be noted that in order to clearly show the content of the invention, FIG. 2 omits the illustration of the thickness of the first dichroic layer and the reflective layer, and the figures of other embodiments also omit the illustration of the thickness of some material layers (FIGS. 2-4, 6 also omit the illustration of the thickness of the dichroic layer and/or the reflective layer). Please refer to FIGS. 1 and 2. The homogenizing element 100 includes a light incident end I1, a light exit end E1, a first surface 110, a second surface 120, a reflective layer 130 and a first dichroic layer 140. The first surface 110 extends from the light incident end I1 to the light exit end E1. The second surface 120 extends from the light incident end I1 to the light exit end E1. The second surface 120 overlaps the first surface 110, and the second surface 120 is non-parallel to the first surface 110. The second surface 120 is disposed to, for example, surround the first surface 110.

The homogenizing element 100 has an optical axis R, and the optical axis R passes through the light incident end I1 and the light exit end E1. The first dichroic layer 140 is disposed on the first surface 110 and configured to allow the first beam L1 to pass therethrough and reflect the second beam L2. The reflective layer 130 is disposed on the second surface 120 and configured to reflect the first beam L1.

In detail, in this embodiment, the second surface 120 overlaps the first surface 110 in the direction perpendicular to the optical axis R. The first surface 110 includes, for example, surrounding four first planes 111, 112, 113 and 114. The second surface 120 includes, for example, surrounding four second planes 121, 122, 123 and 124. The four second planes 121, 122, 123 and 124 respectively correspond to the four first planes 111, 112, 113 and 114. As shown in FIG. 1, the second plane 121 overlaps the first plane 111 in the direction perpendicular to the optical axis R. Similarly, the second plane 122 overlaps the first plane 112, the second plane 123 overlaps the first plane 113, and the second plane 124 overlaps the first plane 114, in the direction perpendicular to the optical axis R. In addition, the first surface 110 and the second surface 120 are non-parallel to each other. Specifically, the first plane 111 and the second plane 121 facing each other may be non-parallel to each other. Similarly, the first plane 112 and the second plane 122, the first plane 113 and the second plane 123, and the first plane 114 and the second plane 124 may be non-parallel to each other. In this embodiment, the angles between the first planes 111, 112, 113 and 114 and the corresponding second planes 121, 122, 123 and 124 can be between 5 degrees and 25 degrees, but are not limited thereto. Furthermore, in this embodiment, each of the first planes 111, 112, 113 and 114 is non-parallel to the optical axis R, and each of the second planes 121, 122, 123 and 124 is parallel to the optical axis R, but the invention is not limited thereto. In other embodiments, the first planes 111, 112, 113 and 114 can be selectively parallel or non-parallel to the optical axis R, and the second planes 121, 122, 123 and 124 can also be selectively parallel or non-parallel to the optical axis R.

The first dichroic layer 140 is, for example, disposed on the first planes 111, 112, 113 and 114 to form a first light guide space G1 (shown FIG. 2). The reflective layer 130 is, for example, disposed on the second planes 121, 122, 123 and 124 to form a second light guide space G2 (shown FIG. 2). The first light guide space G1 is located in the second light guide space G2, that is, the second light guide space G2 includes the first light guide space G1. In detail, the first dichroic layer 140 can reflect the second beam L2 and allow the first beam L1 to pass therethrough, so that the second beam L2 can only be transmitted in the first light guide space G1. Because each of the first planes 111, 112, 113 and 114 is non-parallel to the optical axis R, the beam angle of the second beam L2 exiting from the light exit end E1 can be adjusted through the first light guide space G1. On the other hand, the reflective layer 130 can reflect the first beam L1 passing through the first dichroic layer 140, so that the first beam L1 can be transmitted in the second light guide space G2. Therefore, the beam angle of the first beam L1 exiting from the light exit end E1 can be adjusted or maintained through the second light guide space G2. In this embodiment, the first beam L1 and the second beam L2, for example, have different wavelengths (e.g., peak wavelength or dominant wavelength). For example, the first beam L1 can be blue light, the second beam L2 can be yellow light, and the first dichroic layer 140 can be a dichroic coating that can reflect yellow light and allow blue light to pass therethrough, so that the yellow light can only be transmitted in the first light guide space G1.

Specifically, in this embodiment, the homogenizing element 100 may further include a hollow rod 150 and a solid rod 160. The hollow rod 150 has four inner surfaces, and the four inner surfaces extend from the light incident end I1 to the light exit end E1. In this embodiment, the inner surfaces and outer surfaces of the hollow rod 150 are, for example, parallel to the optical axis R. The solid rod 160 has four surfaces, and the four surfaces extend from the light incident end I1 to the light exit end E1, but the invention is not limited thereto. In other embodiments, the solid rod 160 may be replaced by a hollow rod composed of four transparent substrates (such as glass). The second surface 120 is located, for example, on the inner surface of the hollow rod 150, that is, the second planes 121, 122, 123 and 124 shown in FIG. 1 are the inner surfaces of the hollow rod 150. However, the second surface 120 may be located on the outer surface of the hollow rod 150 in other embodiments of the invention, and related features will be described in the following embodiments. In addition, the solid rod 160 is, for example, disposed in the hollow rod 150. The first surface 110 may be located on the surface of the solid rod 160, that is, the first planes 111, 112, 113 and 114 shown in FIG. 1 are the surfaces of the solid rod 160. The shapes of the hollow rod 150 and the solid rod 160 are, for example, symmetrical to the optical axis R (shown in FIG. 2) of the homogenizing element 100, so that each beam can be emitted at the light exit end E1 in a light pattern symmetrical to the optical axis R after passing through the hollow rod 150 and the solid rod 160, thereby achieving a homogenizing light effect. The hollow rod 150 includes, for example, four mirrors, but is not limited thereto.

The solid rod 160 has, for example, a first end surface 161 (shown in FIG. 2) at the light incident end I1 and a second end surface 162 (shown in FIG. 2) at the light exit end E1. The hollow rod 150 may have a first opening O1 at the light incident end I1 and a second opening O2 at the light exit end E1. In this embodiment, the area of the first end surface 161 is smaller than the area of the second end surface 162, the area of the first opening O1 is equal to the area of the second opening O2, and the area of the second end surface 162 is equal to the area of the second opening O2, but the invention is not limited thereto. In other embodiments, the area of the first opening O1 may be smaller than the area of the second opening O2. In detail, in the direction from the light incident end I1 to the light exit end E1, the first planes 111, 112, 113 and 114 are gradually inclined toward the direction away from the optical axis R, so that the area of the first end surface 161 is smaller than the area of the second end surface 162. Because the first planes 111, 112, 113 and 114 are designed to be inclined as described above, the beam angle of the second beam L2 can be narrowed after the second beam L2 is reflected multiple times in the first light guide space G1. On the other hand, the second planes 121 and 122 are substantially parallel to each other, the second planes 123 and 124 are substantially parallel to each other, and the shape of the hollow rod 150 is symmetrical to the optical axis R of the homogenizing element 100, so that the beam angle of the first beam L1 remains roughly unchanged after the first beam L1 passes through the second light guide space G2. Therefore, the homogenizing element 100 of this embodiment can respectively adjust the beam angles of the different color beams, so that the beam angle of each color beam can meet the design requirements. For example, in the homogenizing element 100 of this embodiment, when the beams with different beam angles are adjusted to have more uniform beam angles, the beam incident on the homogenizing element 100 at a larger beam angle (e.g., second beam L2) can be reflected and transmitted in the first light guide space G1, and the beam incident on the homogenizing element 100 at a smaller beam angle (e.g., first beam L2) can be reflected and transmitted in the second light guide space G2, so that the first beam L1 and the second beam L2 can be emitted from the light exit end E1 with a more uniform beam angle.

In addition, the hollow rod 150 may have an end surface IS (shown in FIG. 1) at the light incident end I1. The reflective layer 130 may be provided on the end surface IS to prevent the first beam L1 and the second beam L2 from entering a substance of the hollow rod 150 from the end surface IS.

Figure 3:
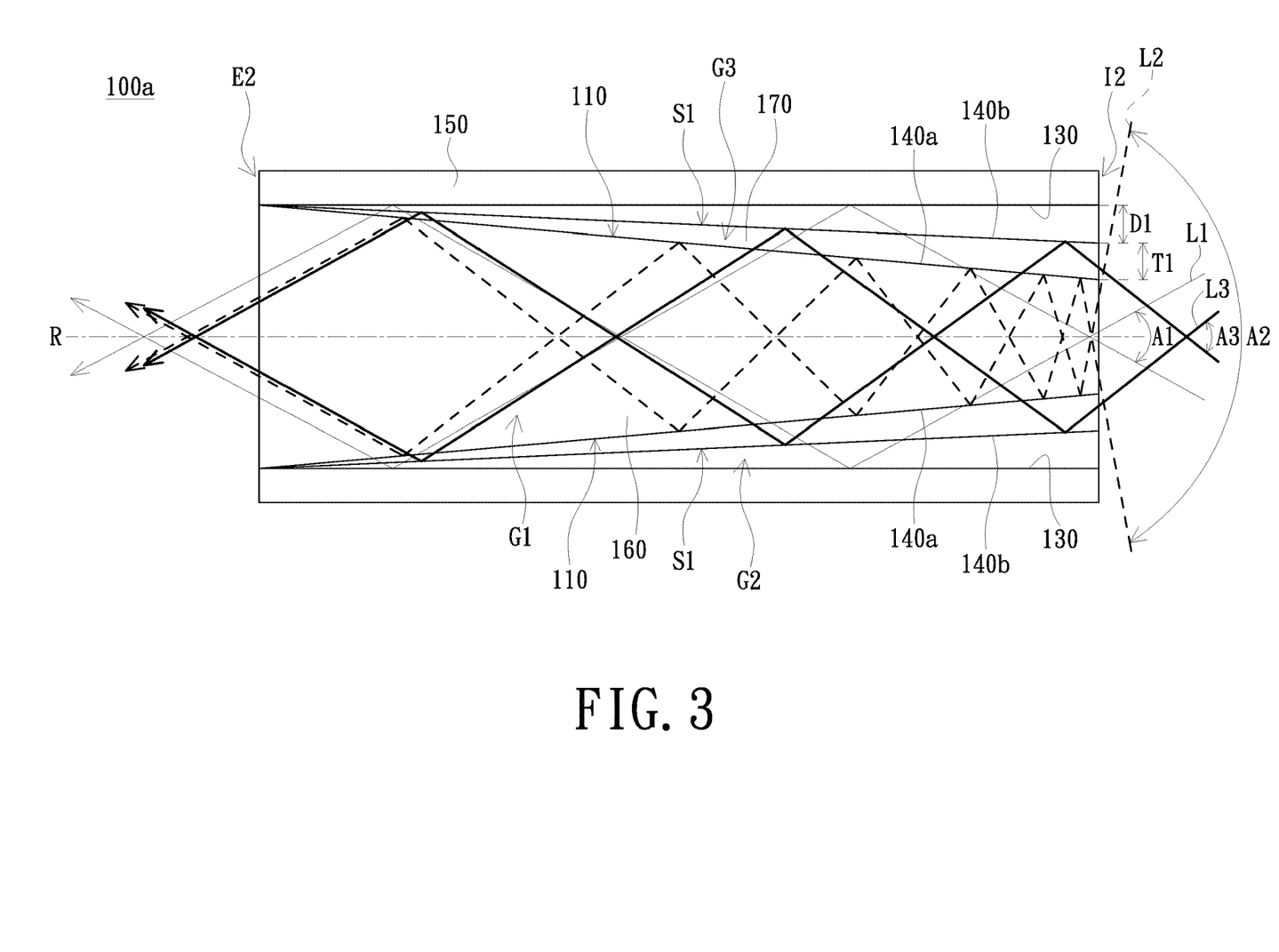
FIG. 3 is a schematic diagram of a homogenizing element according to another embodiment of the invention.

FIG. 3 is a schematic diagram of a homogenizing element according to another embodiment of the invention. The structure and advantages of the homogenizing element 100a of this embodiment are similar to those of the homogenizing element 100 of FIG. 1, and only the differences are described below. Please refer to FIG. 3. The homogenizing element 100a of this embodiment can adjust the beam angles of the three color beams respectively. Specifically, compared to the above-mentioned homogenizing element 100, the homogenizing element 100a of this embodiment further includes a first wedge-shaped hollow rod 170 and a second dichroic layer 140b. The first wedge-shaped hollow rod 170 is disposed between the solid rod 160 and the hollow rod 150. The thickness T1 of the single sidewall of the first wedge-shaped hollow rod 170 gradually decreases from the light incident end I2 to the light exit end E2. There is a first gap D1 between the first wedge-shaped hollow rod 170 and the hollow rod 150 at the light incident end I2. The second dichroic layer 140b is disposed on the surface S1 of the first wedge-shaped hollow rod 170 adjacent to the hollow rod 150, the illustration of the thickness of the second dichroic layer 140b, the first dichroic layer 140a and the reflective layer 130 are omitted in FIG. 3. The second dichroic layer 140b is configured to allow the first beam L1 to pass therethrough and reflect the third beam L3. The first dichroic layer 140a is configured to allow the first beam L1 and the third beam L3 to pass therethrough and reflect the second beam L2.

The solid rod 160 is, for example, disposed in the first wedge-shaped hollow rod 170, and the first wedge-shaped hollow rod 170 contacts with the first dichroic layer 140a on the solid rod 160. For example, the inner surface of the first wedge-shaped hollow rod 170 and the corresponding outer surface of the solid rod 160 (e.g., first surface 110 in FIG. 2) are parallel with each other, that is, the inner surface of the first wedge-shaped hollow rod 170 is closely attached to the first dichroic layer 140a. The surface S1 of the first wedge-shaped hollow rod 170 is, for example, the surrounding outer surface of the first wedge-shaped hollow rod 170, so that the second dichroic layer 140b on the surface S1 of the first wedge-shaped hollow rod 170 can form the third light guide space G3. Specifically, the first light guide space G1 is located in the third light guide space G3, that is, the third light guide space G3 includes the first light guide space G1, and the first light guide space G1 and the third light guide space G3 are located in the second light guide space G2. Because the second dichroic layer 140b can reflect the third beam L3, the third light guide space G3 can transmit the third beam L3 to adjust the beam angle of the third beam L3 at the light exit end E2. Similar to the embodiment of FIGS. 1 and 2, the second dichroic layer 140b can be configured according to the wavelength of the third beam L3. For example, the third beam L3 may be green light, and the second dichroic layer 140b may be configured as a dichroic coating that can reflect green light and allow other color beams to pass therethrough, so that the green light can be transmitted in the third light guide space G3. In this embodiment, the refractive index of the material of the first wedge-shaped hollow rod 170 and that of the solid rod 160 can be the same to reduce the refraction produced when the first beam L1 and the third beam L3 transmitted between the solid rod 160 and the first wedge-shaped hollow rod 170. In this embodiment, the first gap D1 is, for example, an air gap, but not limited thereto. It should be noted that in other embodiments, the first dichroic layer 140a may be disposed on the inner surface of the first wedge-shaped hollow rod 170, but the invention is not limited thereto.

As shown in FIG. 3, the surface S1 of the first wedge-shaped hollow rod 170 where the second dichroic layer 140b is disposed and the first surface 110 where the first dichroic layer 140a is disposed are gradually inclined toward the optical axis R from the light exit end E2 to the light incident end I2. In this way, the shapes of the first light guide space G1 and the third light guide space G3 can allow the beam to exit at a smaller beam angle. In addition, in design, the degree of inclination of the first surface 110 may be different from the degree of inclination of the surface S1 of the first wedge-shaped hollow rod 170, so that the third light guide space G3 and the first light guide space G1 have different effects on narrowing the beam angle. For example, the first light guide space G1 can have a better effect of narrowing the beam angle than the third light guide space G3 when the degree of inclination of the first surface 110 is greater than the degree of inclination of the surface S1 of the first wedge-shaped hollow rod 170. In this embodiment, the angle (or beam angle) at which the first beam L1 enters the light incident end I2 may be smaller than the angle (or beam angle) at which the second beam L2 enters the light incident end I2, and the angle at which the third beam L3 enters the light incident end I2 may be smaller than the angle at which the second beam L2 enters the light incident end I2. The aforementioned angles are, for example, the beam angle A1 of the first beam L1, the beam angle A2 of the second beam L2, and the beam angle A3 of the third beam L3 shown in FIG. 3. In this way, the second beam L2 with the largest beam angle can be adjusted by the first light guide space G1, the third beam L3 with the second largest beam angle can be adjusted by the third light guide space G3, and first beam L1 with the smallest beam angle can be adjusted by the second light guide space G2 to make the beam angles of the first beam L1, the second beam L2 and the third beam L3 become more uniform.

Figure 4:
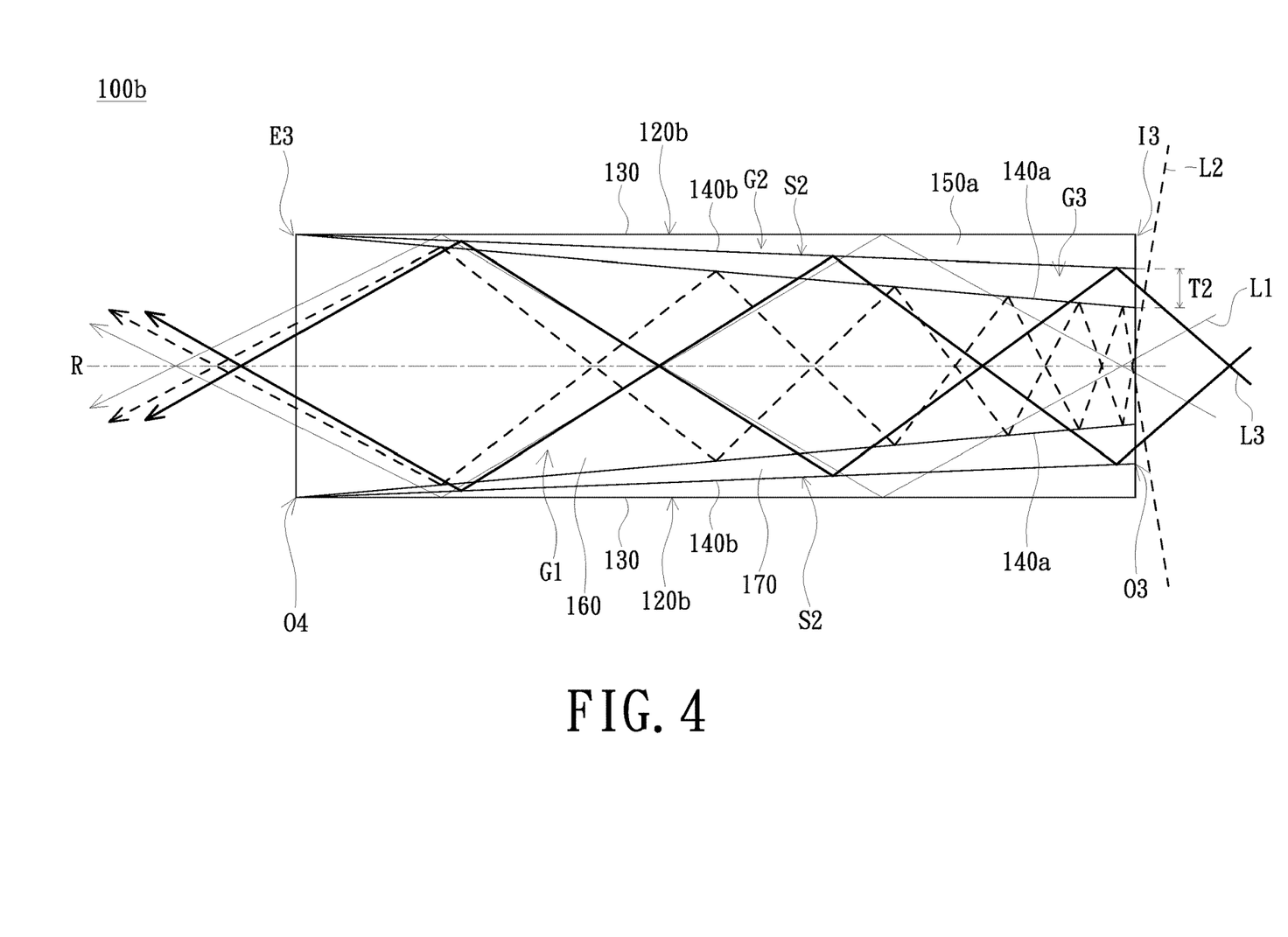
FIG. 4 is a schematic diagram of a homogenizing element according to another embodiment of the invention.

FIG. 4 is a schematic diagram of a homogenizing element according to another embodiment of the invention. The structure and advantages of the homogenizing element 100b of this embodiment are similar to those of the homogenizing element 100a of FIG. 3, and only the differences are described below. Please refer to FIG. 4. The illustration of the thickness of the second dichroic layer 140b, the first dichroic layer 140a and the reflective layer 130 are omitted in FIG. 4. Specifically, the main difference between the homogenizing element 100b of this embodiment and the homogenizing element 100a is the structure of the hollow rod 150a and the arrangement of the reflective layer 130. In this embodiment, the second surface 120b where the reflective layer 130 is disposed is, for example, located on the outer surface of the hollow rod 150a. The hollow rod 150a is, for example, formed of a transparent material. The outer surface of the hollow rod 150a is, for example, parallel to the optical axis R. The second dichroic layer 140b may be disposed on the surface S2 of the first wedge-shaped hollow rod 170 adjacent to the hollow rod 150a. The area of the first opening O3 of the hollow rod 150a may be smaller than the area of the second opening O4 of the hollow rod 150a. In other words, the inner surface of the hollow rod 150a is non-parallel to the optical axis R. The first wedge-shaped hollow rod 170 of the homogenizing element 100b is disposed between the solid rod 160 and the hollow rod 150a. The thickness T2 of the single sidewall of the first wedge-shaped hollow rod 170, for example, gradually decreases from the light incident end I2 to the light exit end E3. The first wedge-shaped hollow rod 170, for example, directly contacts the first dichroic layer 140a, and the hollow rod 150a, for example, directly contact the second dichroic layer 140b, that is, there is no gap between the solid rod 160, the first dichroic layer 140a, the first wedge-shaped hollow rod 170, the second dichroic layer 140b, and the hollow rod 150a. The second dichroic layer 140b is configured to allow the first beam L1 to pass therethrough and reflect the third beam L3. The first dichroic layer 140a is configured to allow the first beam L1 and the third beam L3 to pass therethrough and reflect the second beam L2. The beam angle at which the third beam L3 is incident on the light incident end I2 is smaller than the beam angle at which the second beam L2 is incident on the light incident end I2. The second surface 120b may be a surrounding outer surface of the hollow rod 150b, so as the reflective layer 130 may be provided on the second surface 120b to form the second light guide space G2. The surface S2 of the first wedge-shaped hollow rod 170 is, for example, a surrounding outer surface of the first wedge-shaped hollow rod 170, and the hollow rod 150a can surround and contact the surface S2 of the first wedge-shaped hollow rod 170. Similar to the homogenizing element 100a of FIG. 3, the second dichroic layer 140b may be provided on the surface S2 of the first wedge-shaped hollow rod 170 to form the third light guide space G3, so as to adjust the beam angle of the third beam L3 at the light exit end E3.

Figure 5:
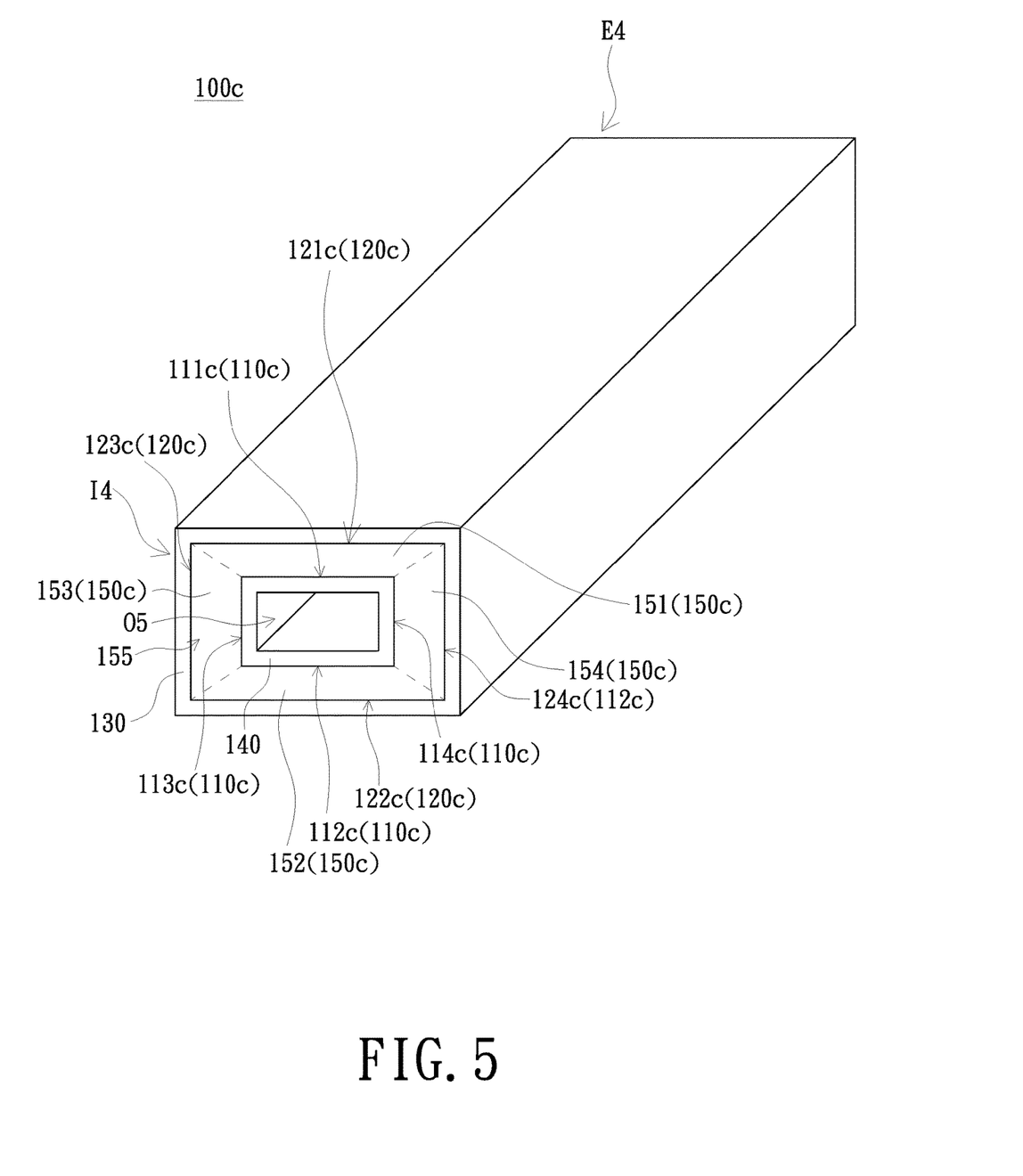
FIG. 5 is a three-dimensional schematic diagram of a homogenizing element according to another embodiment of the invention.
Figure 6:
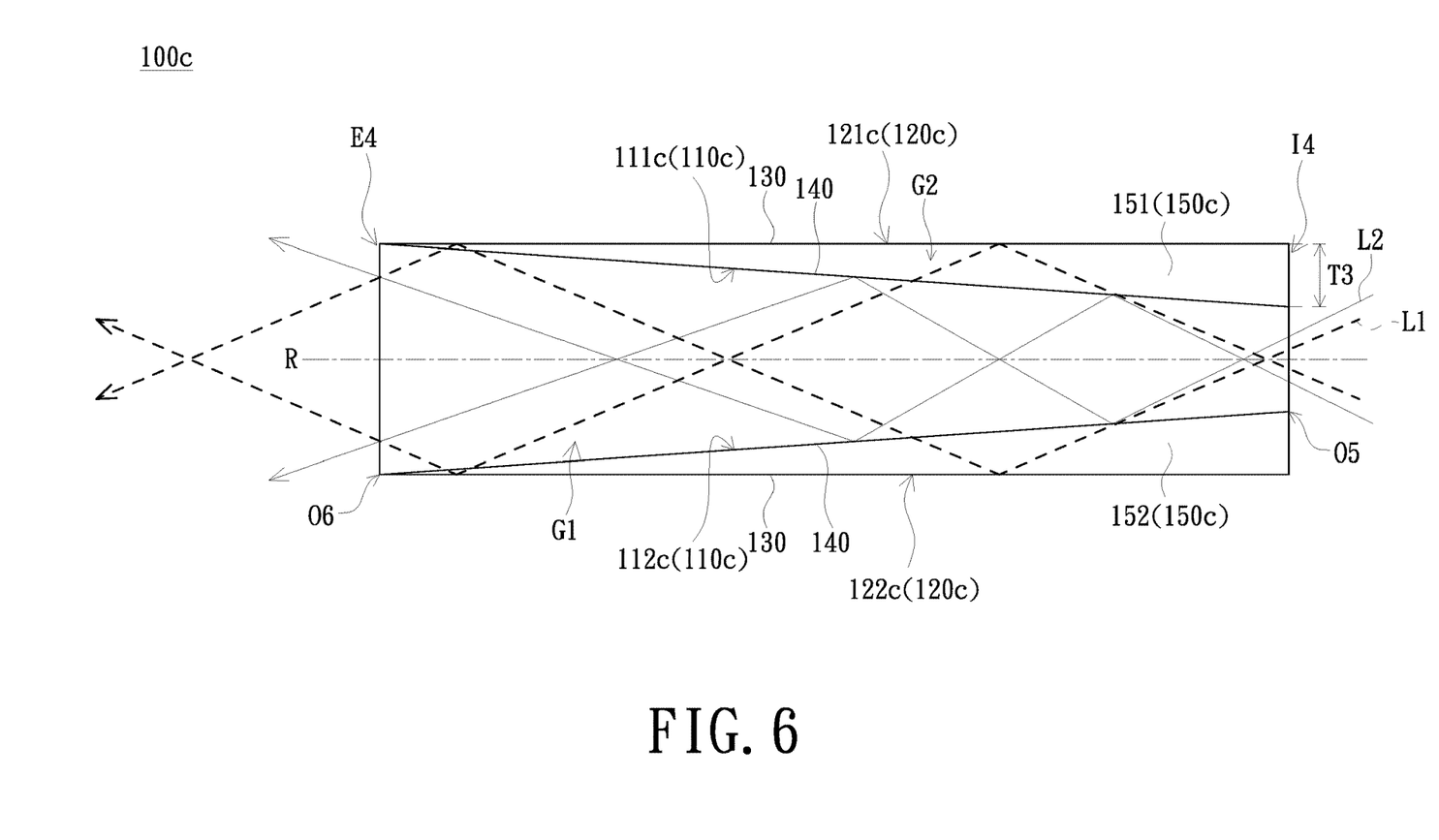
FIG. 6 is a schematic cross-sectional diagram of the homogenizing element of FIG. 5.

FIG. 5 is a three-dimensional schematic diagram of a homogenizing element according to another embodiment of the invention. FIG. 6 is a schematic cross-sectional diagram of the homogenizing element of FIG. 1. The structure and advantages of the homogenizing element 100c of this embodiment are similar to those of the homogenizing element 100 of FIG. 1. The main difference is that the homogenizing element 100c is not provided with a solid rod and has a different structure to form a hollow rod. Specifically, the hollow rod 150c has a first opening O5 at the light incident end I4 and a second opening O6 at the light exit end E4 (shown in FIG. 6). The area of the first opening O5 is smaller than the area of the second opening O6. The second surface 120c where the reflective layer 130 is disposed is located on the outer surface of the hollow rod 150c, and the first surface 110c where the first dichroic layer 140 is disposed is located on the inner surface of the hollow rod 150c. Similar to each of the previous embodiments, the reflective layer 130 can form the second light guide space G2 on the second surface 120c, and the first dichroic layer 140 can form the first light guide space G1 on the first surface 110c.

Furthermore, as shown in FIG. 5, the hollow rod 150c is composed of four wedge-shaped members 151, 152, 153 and 154. Specifically, the first surface 110c includes, for example, four first planes 111c, 112c, 113c and 114c, which are respectively located on the sides of the four wedge-shaped members 151, 152, 153 and 154 facing each other. On the other hand, the second surface 120c includes, for example, four second planes 121c, 122c, 123c and 124c, which are respectively located on the sides of the four wedge-shaped members 151, 152, 153 and 154 facing away from each other. In addition, as shown in FIG. 6, the thickness T3 of the wedge-shaped component 151 can gradually decrease from the light incident end I4 to the light exit end E4, and the thickness of the other wedge-shaped components 152, 153 and 154 varies with the thickness T3 of the wedge-shaped component 151. Please refer to FIGS. 5 and 6 together. The illustration of the thickness of the first dichroic layer 140 and the reflective layer 130 are omitted in FIG. 6. In detail, the first dichroic layer 140 disposed on the first surface 110c forms the first light guide space G1, and the reflective layer 130 disposed on the second surface 120c forms the second light guide space G2. In the direction from the light incident end I4 to the light exit end E4, the first planes 111c, 112c, 114c and 113c are gradually inclined toward the direction away from the optical axis R, so that the beam angle of the second beam L2 can be narrowed after the second beam L2 is reflected multiple times in the first light guide space G1. On the other hand, the second planes 121c and 122c are substantially parallel to each other, and the second planes 123c and 124c are substantially parallel to each other, so that the beam angle of the first beam L1 remains substantially unchanged after the first beam L1 passes through the second light guide space G2. In other words, the hollow rod 150c may be composed of the same four wedge-shaped components 151, 152, 153 and 154, but the invention is not limited thereto. In other embodiments, the hollow rod 150c may be composed of four or more different wedge-shaped components. Therefore, the homogenizing element 100c of this embodiment can adjust the beam angles of the different color beams respectively, so that the beam angle of each color beam can meet the design requirements. It should be noted that the hollow rod 150c may have a first end surface 155 (shown in FIG. 5) at the light incident end I4. The first dichroic layer 140 may further extend to cover the first end surface 155 to prevent the second beam L2 from entering the second light guide space G2 between the first surface 110c and the second surface 120c.

Figure 7:
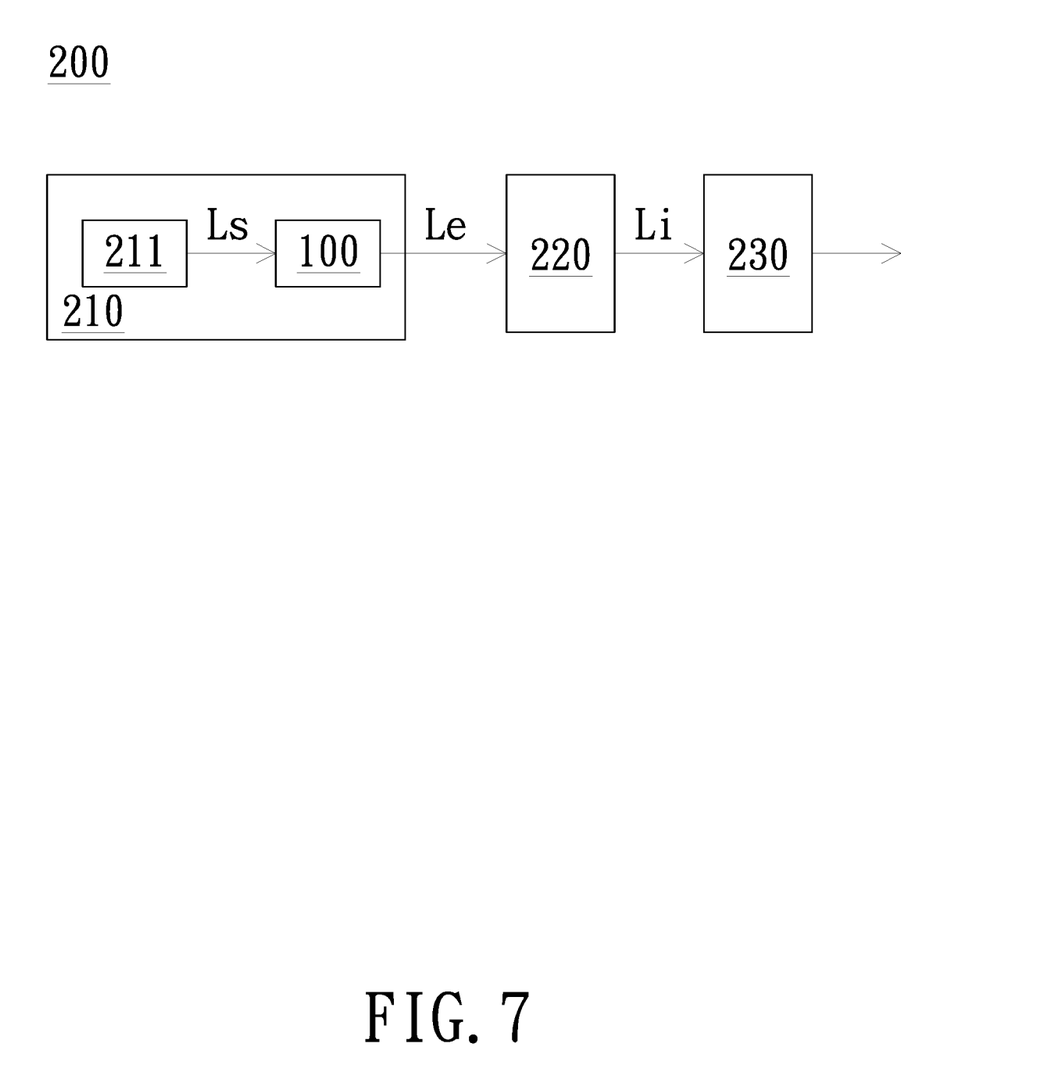
FIG. 7 is a schematic diagram of a projection device according to an embodiment of the invention.

FIG. 7 is a block diagram of a projection device according to an embodiment of the invention. Please refer to FIG. 7. The projection device 200 includes an illumination system 210, a light valve 220 and a projection lens 230. The illumination system 210 is configured to provide an illumination beam Le. The light valve 220 is disposed on the transmission path of the illumination beam Le to convert the illumination beam Le into an image beam Li. The projection lens 230 is disposed on the transmission path of the image beam Li. The illumination system 210 includes a light source module 211 and the above-mentioned homogenizing element 100. The light source module 211 is configured to provide a beam Ls, which includes the first beam L1, the second beam L2 and/or the third beam L3 mentioned above. The homogenizing element 100 is disposed on the transmission path of the beam Ls to convert the beam Ls into the illumination beam Le.

The light source module 211 includes, for example, a light emitting diode (LED) or a laser diode (LD). The number of light emitting diodes or laser diodes may be one or more. For example, the light emitting diodes (or laser diodes) can be arranged in a matrix when the number of light emitting diodes (or laser diodes) is plural. The homogenizing element 100 is disposed on the transmission path of the beam Ls, so as to adjust the beam angles of the first beam L1 and the second beam L2 in the beam Ls to form the illumination beam Le. In detail, in one embodiment, the light source module 211 further includes, for example, a wavelength conversion element (not shown), the first beam L1 is, for example, a beam used to illuminate the wavelength conversion element, and the second beam L2 is, for example, a converted beam generated by the wavelength conversion element, but the invention is not limited thereto.

The light valve 220 is, for example, a digital micromirror device (DMD), a liquid crystal on silicon (LCoS) or a liquid crystal display (LCD), but is not limited thereto. In addition, this embodiment does not limit the number of light valves 220. For example, the projection device 200 of this embodiment can adopt a single-chip liquid crystal display panel or three-chip liquid crystal display panel structure, but is not limited thereto.

The projection lens 230 includes, for example, one or more optical lenses, and the refractive powers of the optical lenses may be the same or different from each other. For example, the optical lens may include various non-planar lenses such as biconcave lenses, biconvex lenses, meniscus lenses, convex-concave lenses, plano-convex lenses, and plano-concave lenses, or any combination of the above-mentioned non-planar lenses. On the other hand, the projection lens 230 may also include a planar optical lens. This embodiment does not limit the type and configuration of the projection lens 230.

Because the projection device 200 of this embodiment adopts the homogenizing element 100, the beam angles of the first beam L1 and the second beam L2 can be adjusted respectively, so that the first beam L1 and the second beam L2 can approximately exactly cover the entire active area of the light valve 220 when irradiating the light valve 220. Therefore, not only the light utilization rate improved, but also the problems of color spots and uneven brightness are eliminated, so that the projection device 200 has the advantage of good image quality. In addition, the homogenizing element 100 can also be replaced with the homogenizing element 100a, 100b or 100c of the other embodiments described above.

In summary, in the homogenizing element of the embodiment of the invention, because of the overlapping and non-parallel first dichroic layer and the reflective layer, the beam angle of the second beam can be adjusted by the first dichroic layer and the beam angle of the first beam can be adjusted by the reflective layer. Therefore, the homogenizing element of the embodiment of the invention can adjust the beam angles of the different color beams respectively, so that the color beams can be emitted at a more uniform beam angle. Since adopting the above-mentioned homogenizing element, the projection device of the invention has the advantage of good image quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first dichroic layer, the second dichroic layer, the first surface, the second surface, the first beam, the second beam, the first end surface, the second end surface, the first light guide space, the second light guide space, the first plane, the second plane, the first opening and the second opening are only used for distinguishing various elements and do not limit the number of the elements.

What is claimed is:

1. A homogenizing element, comprising a light incident end, a light exit end, a first surface, a second surface, a reflective layer and a first dichroic layer, wherein:
   the first surface extends from the light incident end to the light exit end;
   the second surface extends from the light incident end to the light exit end, and the second surface overlaps the first surface and is non-parallel to the first surface;
   the first dichroic layer is disposed on the first surface and configured to allow a first beam to pass therethrough and reflect a second beam; and
   the reflective layer is disposed on the second surface and configured to reflect the first beam,
   wherein the first surface comprises surrounding four first planes, the second surface comprises surrounding four second planes, the four second planes of the second surface respectively correspond to the four first planes of the first surface, and an included angle between the first plane and the second plane corresponding to the first plane is between 5 degrees and 25 degrees.

2. The homogenizing element according to claim 1, further comprising a hollow rod and a solid rod, wherein the second surface is located on an inner surface or an outer surface of the hollow rod, the solid rod is disposed in the hollow rod, and the first surface is located on a surface of the solid rod.

3. The homogenizing element according to claim 2, wherein the solid rod has a first end surface at the light incident end and a second end surface at the light exit end, the hollow rod has a first opening at the light incident end and a second opening at the light exit end, an area of the first end surface is smaller than an area of the second end surface, and an area of the first opening is smaller than or equal to an area of the second opening.

4. The homogenizing element according to claim 3, wherein the second surface is located on the outer surface of the hollow rod, the area of the first opening of the hollow rod is smaller than the area of the second opening of the hollow rod, and the homogenizing element further comprises:
   a first wedge-shaped hollow rod, disposed between the solid rod and the hollow rod, wherein a thickness of a sidewall of the first wedge-shaped hollow rod gradually decreases from the light incident end to the light exit end, and the first wedge-shaped hollow rod directly contacts the first dichroic layer; and
   a second dichroic layer, disposed on a surface of the first wedge-shaped hollow rod adjacent to the hollow rod, wherein the second dichroic layer is configured to allow the first beam to pass therethrough and reflect a third beam, the first dichroic layer is further configured to allow the third beam to pass therethrough, an angle at which the third beam enters the light incident end is smaller than an angle at which the second beam enters the light incident end, and the second dichroic layer directly contacts the hollow rod.

5. The homogenizing element according to claim 2, further comprising:
   a first wedge-shaped hollow rod, disposed between the solid rod and the hollow rod, wherein a thickness of a sidewall of the first wedge-shaped hollow rod gradually decreases from the light incident end to the light exit end, and there is a first gap between the first wedge-shaped hollow rod and the hollow rod at the light incident end; and
   a second dichroic layer, disposed on a surface of the first wedge-shaped hollow rod adjacent to the hollow rod, wherein the second dichroic layer is configured to allow the first beam to pass therethrough and reflect a third beam, and the first dichroic layer is further configured to allow the third beam to pass therethrough.

6. The homogenizing element according to claim 5, wherein a refractive index of a material of the first wedge-shaped hollow rod is the same as a refractive index of a material of the solid rod.

7. The homogenizing element according to claim 5, wherein an angle at which the first beam enters the light incident end is smaller than an angle at which the second beam enters the light incident end, and an angle at which the third beam enters the light incident end is smaller than an angle at which the second beam enters the light incident end.

8. The homogenizing element according to claim 1, further comprising a hollow rod, wherein the hollow rod has a first opening at the light incident end and a second opening at the light exit end, an area of the first opening is smaller than an area of the second opening, the second surface is located on an outer surface of the hollow rod, and the first surface is located on an inner surface of the hollow rod.

9. The homogenizing element according to claim 8, wherein the hollow rod has a first end surface at the light incident end, and the first dichroic layer further extends to cover the first end surface.

10. The homogenizing element according to claim 8, wherein the hollow rod is composed of four wedge-shaped components.

11. A projection device, comprising an illumination system, a light valve and a projection lens, wherein the illumination system is configured to provide an illumination beam, the light valve is disposed on a transmission path of the illumination beam to convert the illumination beam into an image beam, the projection lens is disposed on a transmission path of the image beam, the illumination system comprises a light source module and a homogenizing element, the light source module is configured to provide a beam, the beam comprises a first beam and a second beam, the homogenizing element is disposed on a transmission path of the beam to convert the beam into the illumination beam, and the homogenizing element comprises a light incident end, a light exit end, a first surface, a second surface, a reflective layer and a first dichroic layer, wherein:
the first surface extends from the light incident end to the light exit end;
the second surface extends from the light incident end to the light exit end, and the second surface overlaps the first surface and is non-parallel to the first surface;
the first dichroic layer is disposed on the first surface and configured to allow the first beam to pass therethrough and reflect the second beam, wherein an angle at which the first beam enters the light incident end is smaller than an angle at which the second beam enters the light incident end; and
the reflective layer is disposed on the second surface and configured to reflect the first beam.

12. A homogenizing element, comprising a light incident end, a light exit end, a first surface, a second surface, a reflective layer and a first dichroic layer, wherein:
the first surface extends from the light incident end to the light exit end;
the second surface extends from the light incident end to the light exit end, and the second surface overlaps the first surface and is non-parallel to the first surface;
the first dichroic layer is disposed on the first surface and configured to allow a first beam to pass therethrough and reflect a second beam; and
the reflective layer is disposed on the second surface and configured to reflect the first beam;
the homogenizing element further comprises a hollow rod and a solid rod, wherein the second surface is located on an inner surface or an outer surface of the hollow rod, the solid rod is disposed in the hollow rod, and the first surface is located on a surface of the solid rod;
the homogenizing element further comprises:
a first wedge-shaped hollow rod, disposed between the solid rod and the hollow rod, wherein a thickness of a sidewall of the first wedge-shaped hollow rod gradually decreases from the light incident end to the light exit end, and there is a first gap between the first wedge-shaped hollow rod and the hollow rod at the light incident end; and
a second dichroic layer, disposed on a surface of the first wedge-shaped hollow rod adjacent to the hollow rod, wherein the second dichroic layer is configured to allow the first beam to pass therethrough and reflect a third beam, and the first dichroic layer is further configured to allow the third beam to pass therethrough.

13. A homogenizing element, comprising a light incident end, a light exit end, a first surface, a second surface, a reflective layer and a first dichroic layer, wherein:
the first surface extends from the light incident end to the light exit end;
the second surface extends from the light incident end to the light exit end, and the second surface overlaps the first surface and is non-parallel to the first surface;
the first dichroic layer is disposed on the first surface and configured to allow a first beam to pass therethrough and reflect a second beam; and
the reflective layer is disposed on the second surface and configured to reflect the first beam,
the homogenizing element further comprises a hollow rod and a solid rod, wherein the second surface is located on an outer surface of the hollow rod, the solid rod is disposed in the hollow rod, and the first surface is located on a surface of the solid rod,
wherein the solid rod has a first end surface at the light incident end and a second end surface at the light exit end, the hollow rod has a first opening at the light incident end and a second opening at the light exit end, an area of the first end surface is smaller than an area of the second end surface, and an area of the first opening is smaller than an area of the second opening;
wherein the area of the first opening of the hollow rod is smaller than the area of the second opening of the hollow rod, and the homogenizing element further comprises:
a first wedge-shaped hollow rod, disposed between the solid rod and the hollow rod, wherein a thickness of a sidewall of the first wedge-shaped hollow rod gradually decreases from the light incident end to the light exit end, and the first wedge-shaped hollow rod directly contacts the first dichroic layer; and
a second dichroic layer, disposed on a surface of the first wedge-shaped hollow rod adjacent to the hollow rod, wherein the second dichroic layer is configured to allow the first beam to pass therethrough and reflect a third beam, the first dichroic layer is further configured to allow the third beam to pass therethrough, an angle at which the third beam enters the light incident end is smaller than an angle at which the second beam enters the light incident end, and the second dichroic layer directly contacts the hollow rod.

14. A homogenizing element, comprising a light incident end, a light exit end, a first surface, a second surface, a reflective layer and a first dichroic layer, wherein:
the first surface extends from the light incident end to the light exit end;
the second surface extends from the light incident end to the light exit end, and the second surface overlaps the first surface and is non-parallel to the first surface;
the first dichroic layer is disposed on the first surface and configured to allow a first beam to pass therethrough and reflect a second beam; and
the reflective layer is disposed on the second surface and configured to reflect the first beam;
the homogenizing element further comprises a hollow rod, wherein the hollow rod has a first opening at the light incident end and a second opening at the light exit end, an area of the first opening is smaller than an area of the second opening, the second surface is located on an outer surface of the hollow rod, and the first surface is located on an inner surface of the hollow rod;
wherein the hollow rod has a first end surface at the light incident end, and the first dichroic layer further extends to cover the first end surface.

15. A homogenizing element, comprising a light incident end, a light exit end, a first surface, a second surface, a reflective layer and a first dichroic layer, wherein:
the first surface extends from the light incident end to the light exit end;
the second surface extends from the light incident end to the light exit end, and the second surface overlaps the first surface and is non-parallel to the first surface;

the first dichroic layer is disposed on the first surface and configured to allow a first beam to pass therethrough and reflect a second beam; and the reflective layer is disposed on the second surface and configured to reflect the first beam;

the homogenizing element further comprises a hollow rod, wherein the hollow rod has a first opening at the light incident end and a second opening at the light exit end, an area of the first opening is smaller than an area of the second opening, the second surface is located on an outer surface of the hollow rod, and the first surface is located on an inner surface of the hollow rod;

wherein the hollow rod is composed of four wedge-shaped components.

\* \* \* \* \*